United States Patent
Lanquetot et al.

(10) Patent No.: US 7,963,210 B2
(45) Date of Patent: Jun. 21, 2011

(54) SPRING-LOADED BRAKE CYLINDER HAVING LOCKED STOP BODY

(75) Inventors: Jacques Lanquetot, Trouville/Mer (FR); Sylvain Derouault, Hermival les Vaux (FR)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/716,792

(22) Filed: Mar. 3, 2010

(65) Prior Publication Data

US 2010/0269690 A1 Oct. 28, 2010

Related U.S. Application Data

(63) Continuation of application No. PCT/EP2008/006914, filed on Aug. 22, 2008.

(30) Foreign Application Priority Data

Sep. 4, 2007 (DE) .......................... 10 2007 041 769

(51) Int. Cl.
*B60T 17/08* (2006.01)
*F16D 65/32* (2006.01)
(52) U.S. Cl. ........... 92/63; 92/13.6; 92/130 A; 91/363 R
(58) Field of Classification Search ................ 92/13.6, 92/63, 130 R, 130 A; 91/363 R
See application file for complete search history.

(56) References Cited

U.S. PATENT DOCUMENTS

| 4,729,290 | A | * | 3/1988 | Ewald et al. | 92/63 |
| 5,632,192 | A | * | 5/1997 | Plantan et al. | 92/63 |
| 5,943,940 | A | * | 8/1999 | Angerfors | 92/5 R |
| 6,588,314 | B1 | * | 7/2003 | Stojic | 92/63 |
| 2004/0060784 | A1 | | 4/2004 | Gravier | |

FOREIGN PATENT DOCUMENTS

| DE | 196 30 795 A1 | 2/1998 |
| DE | 198 30 154 A1 | 1/1999 |
| WO | WO 97/07322 A1 | 2/1997 |
| WO | WO 02/44004 A1 | 6/2002 |

OTHER PUBLICATIONS

International Search Report dated Jan. 30, 2009 with English translation (four (4) pages).

* cited by examiner

*Primary Examiner* — Thomas E Lazo
(74) *Attorney, Agent, or Firm* — Crowell & Moring LLP

(57) ABSTRACT

A spring-loaded brake cylinder for commercial vehicles includes at least one spring-loaded brake piston that can be actuated by a pre-loaded spring and is supported in a housing. A mechanical emergency release device is provided for the emergency release of the spring-loaded brake cylinder. The emergency release device includes an indicator that has an indicator rod indicating the position of the spring-loaded brake piston. The rod extends through a threaded spindle of the emergency release device and is movable in the axial direction. A stop body is disposed in the region of one end of the indicator rod. The stop body is positively connected to the indicator rod by a detent connection produced by an axial relative movement between the indicator rod and the stop body.

15 Claims, 2 Drawing Sheets

SPRING-LOADED BRAKE CYLINDER HAVING LOCKED STOP BODY

CROSS-REFERENCE TO RELATED APPLICATIONS

This application is a continuation of PCT International Application No. PCT/EP2008/006914, filed Aug. 22, 2008, which claims priority under 35 U.S.C. §119 from German Patent Application No. DE 10 2007 041 769.3, filed Sep. 4, 2007, the entire disclosures of which are herein expressly incorporated by reference.

BACKGROUND AND SUMMARY OF THE INVENTION

The present invention relates to a spring-loaded brake cylinder which is used, in particular, in commercial vehicles.

A spring-loaded brake cylinder of this type usually has a housing, in which a spring-loaded brake piston is guided. The piston divides the interior of the housing into a spring-loaded brake chamber which can be loaded with pressure and a spring chamber which receives an accumulator spring. The accumulator spring is arranged in the spring chamber in such a way that it prestresses the spring-loaded brake piston in the direction of the spring-loaded brake chamber. In order that a vehicle which has been parked or braked and in which the spring-loaded brake cylinder is arranged can be moved, the spring-loaded brake chamber is loaded with compressed air in such that the spring-loaded brake piston is displaced counter to the spring force of the accumulator spring. As a result, a brake device which is coupled to the spring-loaded brake piston moves out of engagement with a brake disk or the like, with the result that the vehicle is no longer being braked. For brake actuations while driving, a spring-loaded brake cylinder of this type can be coupled to a service brake cylinder in a known way.

If a substantial reduction in the air pressure in the spring-loaded brake chamber occurs on account of a pressure drop in the system, then the spring-loaded brake piston is displaced in the direction of the spring-loaded brake chamber, on account of the prestress of the accumulator spring, in such a way that the brake device, which is coupled to the spring-loaded brake piston, grips and carries out braking of the vehicle. In this way, a commercial vehicle is reliably prevented from continuing to drive in an unbraked manner and therefore being difficult to control, for example in the case of a line rupture of the brake pressure line during driving. This emergency braking in the case of a lack of compressed air feed is additionally also used in trailers, etc., which are parked for a relatively long time, in order that said vehicles can be prevented from rolling away unintentionally.

However, it is to be possible for the braking action, which is exerted in such cases by the mechanical accumulator spring in the spring-loaded brake cylinder, to be released again, for example in order to move parked vehicles or in order to clear a driving lane which is blocked on account of a breakdown, in order that the relevant vehicles can be moved and, for example, traffic obstructions can be eliminated.

Since, however, the available compressed air supply is frequently damaged here by lines being torn off, etc. and cannot be used and there is also no replacement compressed air supply, it is necessary in practice that spring-loaded brake cylinders of this type have a mechanical emergency release device. This is usually provided with an actuating device in the form of a threaded spindle which is accessible from outside and can be actuated in a rotatable manner.

Here, the threaded spindle interacts in a known construction, as described in DE 198 30 154 A1, with an output element which is arranged in a stationary manner in the axial direction on the housing of the spring-loaded brake cylinder, such as a nut, with the result that a rotation of the threaded spindle brings about a linear displacement of the same. In this concrete embodiment, the inner end of the threaded spindle in the axial direction is configured, for example, with a projection which can be brought into contact with a bearing face on the spring-loaded piston. On account of the linear movement of the threaded spindle in the axial direction, which is initiated by the rotational movement, a likewise linear displacement of the spring-loaded piston occurs counter to the prestressing force of the accumulator spring, so that, as a result, the brake device which interacts with the spring-loaded piston can be released.

This construction has proven itself in practice with regard to its functionality. However, it has the disadvantage that the threaded spindle has to be screwed relatively far out of the housing for mechanical emergency release, which leads to a considerable space requirement on the side of the spring-loaded brake cylinder. However, such a space is provided in the commercial vehicle for other components or is restricted by other moving components.

In order to counteract this problem, WO 02/44004 proposes a different construction of the mechanical emergency release device. In this proposed design, the threaded spindle is fixed in a stationary manner in the axial direction on the housing of the spring-loaded brake cylinder. At the same time, however, the threaded spindle is mounted rotatably and is provided at the end which is accessible from outside with an action face for a turning tool, such as with a hexagonal head or the like, by means of which the threaded spindle can be set in rotation. This threaded spindle engages into a central cavity of the spring-loaded piston, the threaded spindle being in engagement here with a hexagonal nut which is mounted in the interior of the spring-loaded piston such that it cannot be rotated, but can be displaced in the axial direction. In order to release the spring-loaded brake, the threaded spindle is actuated rotationally here such that the nut, which runs on it, is guided against a bearing face on the spring-loaded piston and, if the threaded spindle is turned further, drives the spring-loaded piston counter to the prestress of the accumulator spring. This construction has the substantial advantage that no clearance is required on the exterior of the cylinder for a threaded spindle which needs to be screwed out.

Furthermore, the known emergency release device has an indicator device with an indicator rod which points to a display section. Here, the indicator rod extends through the threaded spindle centrally and is guided in it such that a movement is possible in the axial direction. Here, the indicator rod is prestressed against a stepped section in the threaded spindle by a spring such that the display section is pressed to the outside. Depending on whether the spring-loaded brake cylinder is situated in the emergency released state or not, the display section of the indicator rod protrudes beyond the threaded spindle to the outside or is recessed in it, which represents a visible signal for the state of the spring-loaded brake cylinder.

Arranged at that end of the indicator rod, which is remote from the display section, is a disk. The disk is arranged transversely with respect to the axial direction, serves as a stop, and protrudes on the circumferential side in such a way that the outer edge of the disk can come into contact with the nut. Here, the disk is fixed by a locking washer on the control section of the indicator rod. Since, however, components of the emergency release device such as this disk and its locking washer are arranged in the interior of the spring-loaded brake cylinder, their assembly is made more difficult, however.

It is therefore an object of the present invention to develop a spring-loaded brake cylinder such that it can be assembled more simply and less expensively.

This object is achieved by a spring-loaded brake cylinder for vehicles, having at least one spring-loaded brake piston which can be actuated by an accumulator spring. The piston is mounted in a housing, and is delimited on one side by a spring-loaded brake chamber and on the opposite side by a spring chamber which receives the accumulator spring and is connected to a spring-loaded piston rod. A mechanical emergency release device is provided for the emergency release of the spring-loaded brake cylinder. An axial displacement of the spring-loaded brake piston counter to the prestress of the accumulator spring is brought about by way of the emergency release device. The emergency release device has a threaded spindle which is fixed rotatably on the housing and is in engagement with an axially displaceable transmission device which is held non-rotatably in the emergency release device. The transmission device is brought into contact with a bearing face on the spring-loaded brake piston for the emergency release of the spring-loaded brake cylinder. An indicator device includes an indicator rod which indicates the position of the spring-loaded brake piston. The rod reaches through the threaded spindle and can be displaced in the axial direction with respect to the latter. A stop body which can be brought into engagement with the transmission device is arranged in the region of one end of the indicator rod. The stop body is connected positively to the indicator rod by a latching connection which is produced by an axial relative movement between the indicator rod and the stop body.

The invention provides for the stop body to be connected positively by a latching connection, which is produced by way of an axial relative movement between the indicator rod and the stop body. The connection between the indicator rod and the stop body can then be produced merely by means of the relative movement, without it being necessary for this purpose, however, that access to the connecting point is possible. Rather, the relative movement can be caused from the exterior, that is to say from outside the housing, for example by the fact that the indicator rod is inserted from the outside into the through opening of the threaded spindle which is provided for it, to such a depth that its end latches with the stop body. In comparison with the prior art according to WO 02/44004 discussed above, this results in the advantage that a locking washer no longer has to be mounted to hold the disk, which serves there as a stop body, and the production outlay is reduced in comparison.

Particularly preferably, at least in the region of one edge of a receiving opening for the end of the indicator rod, the stop body is of an elastic configuration such that the edge of the receiving opening can be passed and reached behind by an annular collar which is formed on the end of the indicator rod and has a greater diameter than the diameter of the receiving opening, on account of the relative movement between the indicator rod and the stop body.

In particular, the stop body can be supported on the spring-loaded brake piston rod in a sprung manner by way of spring means if the indicator rod is moved axially with respect to the stop body in order to produce the latching connection.

A particularly space-saving arrangement results if the stop body has a cup-shaped configuration, with a bottom which has the receiving opening and with a casing wall which is guided linearly in the spring-loaded brake piston rod, and if the opening of the cup-shaped stop body points away from the indicator rod and the spring means are enclosed at least partially by its casing wall. Moreover, tilt-free mounting of the stop body in the spring-loaded brake piston rod is possible as a result of the flat casing wall. A lightweight construction results if the cup-shaped stop body is manufactured from at least one plastic material. The indicator rod can also be composed of plastic for the same reason.

According to one development of the above-mentioned measure, a central region of the cup-shaped stop body, which central region has the receiving opening, can be configured as a central component which has a greater elasticity than the remaining stop body. The stop body is then guided by its casing wall which is more rigid in comparison, while the latching with the indicator rod is facilitated by the central component which is more elastic in comparison.

In the prior art according to WO 02/44004, the head of the threaded spindle which protrudes out of the housing is configured in multiple pieces, a projection face for applying a tool to the threaded spindle in order to set it in rotation being formed by a separate sleeve. According to one particularly preferable embodiment, the tool projection for applying the tool is manufactured on the threaded spindle in one piece with the latter, which results in an advantageous reduction in the number of parts of the emergency release device.

Other objects, advantages and novel features of the present invention will become apparent from the following detailed description of one preferred embodiment when considered in conjunction with the accompanying drawings.

DETAILED DESCRIPTION OF THE DRAWINGS

Figure 1:
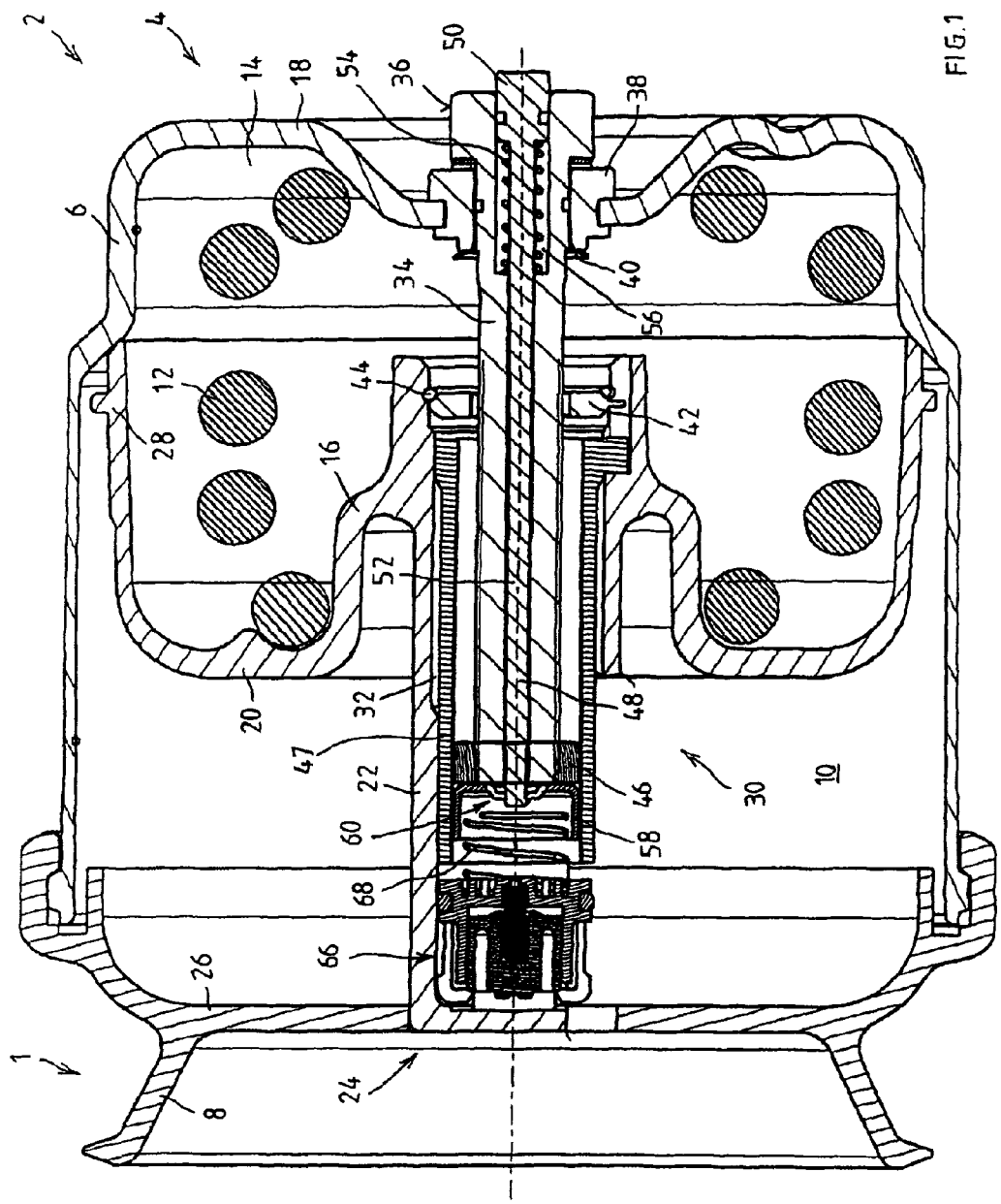
FIG. 1 is a cross-sectional illustration of a spring-loaded brake cylinder with an emergency release device according to one preferred embodiment of the invention.

FIG. 1 shows a detail of a combined service brake and spring-loaded brake cylinder 1 (combined brake cylinder) of a pneumatic or electropneumatic brake system of a commercial vehicle. This includes a service brake apparatus (not shown here) having a service brake cylinder with a housing, in which a service brake piston is guided which can be loaded pneumatically and actuates, for example, a disc brake of the commercial vehicle via a service brake piston rod.

Furthermore, the combined cylinder 1 includes a spring-loaded brake device 2, shown in FIG. 1, having a spring-loaded brake cylinder 4 with a housing 6, to which a flange 8 is coupled in such a way that the housing 6 and the flange 8 form a substantially closed unit. The service brake cylinder can be coupled to the flange 8, for example. A spring-loaded brake piston 16, which can be stressed by pneumatic pressure in a spring-loaded brake chamber 10 counter to the spring force of an accumulator spring 12 in a spring chamber 14 and by which the service brake piston (not shown) can be loaded in the brake application direction, is guided in the housing 6. Here, the accumulator spring 12 is supported firstly on a bottom 18 of the housing 6 and secondly on a piston collar 20 of the spring-loaded brake piston 16. The service brake cylinder and the spring-loaded brake cylinder 4 then form the combined brake cylinder 1, arranged coaxially one behind the other.

A spring-loaded brake piston rod 22 of the spring-loaded brake piston 16 penetrates sealingly a through opening 24 in a dividing wall 26 which is integral with the flange 8 between the spring-loaded brake cylinder 4 and the service brake cylinder, and can come into contact with the service brake piston (not shown) by way of its end face. Moreover, the spring-loaded brake piston 16 also has a guide section 28, which is guided in a sealed manner on the circumferential side in a cylinder section of the housing 6.

In a known manner, the spring-loaded brake piston 16 can be moved into the release position counter to the action of the accumulator spring 12 by ventilation (pressurizing) of the spring-loaded brake chamber 10. Furthermore, by ventilation of a service brake chamber which extends between the dividing wall 26 and the service brake piston (not shown), the latter can be moved into the brake application position counter to the action of a restoring spring (also not shown) which is supported at one end on the service brake piston and at the other end on an end wall of the service brake cylinder.

A mechanical emergency release device 30 is integrated at least partially within the spring-loaded brake piston rod 22. By way of the mechanical emergency release device 30, the spring-loaded brake can be released in an emergency or auxiliary manner if the pressure in the system fails. With the aid of the emergency release device 30, mechanical emergency release of the spring-loaded brake is possible by way of manual external action. Here, in this embodiment, the emergency release device 30 is arranged centrally in the spring-loaded brake cylinder 4 and reaches through a central opening of the housing 6 into a cavity 32 of the spring-loaded brake piston rod 22. Here, it has a threaded spindle 34, at the outer end of which a hexagonal head 36 is formed.

According to one particularly preferred embodiment, the projection for applying the tool is configured in the form of the hexagonal head 36 integrally with the threaded spindle 34 and is formed integrally on the spindle 34. The threaded spindle 34 reaches through a sleeve or a bearing part 38 of the housing 6 in such a way that it is guided therein in a sealed manner, in order for it to be possible to carry out a rotational movement. At the same time, the threaded spindle 34 is prevented by a locking washer 40 from carrying out an axial movement with respect to the housing 6. Furthermore, a bearing section 42 of the piston collar 20 is arranged in the cavity 32 of the spring-loaded brake piston rod 22, for example in the form of a disk which is held by a securing ring 44 and against which a nut 46 which can be screwed to the threaded spindle 34 can run and, as a result, can drive the spring-loaded brake piston 16 in the direction of the bottom 18 of the housing 6, that is to say in the brake release direction.

Here, the threaded spindle 34 and the hexagonal head 36 act as an actuating device which interacts with a transmission device in the shape of the nut 46. The nut 46 is in engagement with the thread of the threaded spindle 34 in such a way that a rotational movement of the threaded spindle 34 is transmitted into a linear movement of the nut 46 in the axial direction. To this end, the nut 46, which is configured here as a hexagonal nut, is received positively in a guide part 47 in the cavity 32 of the spring-loaded brake piston rod 22 in such a way that it cannot be rotated.

Furthermore, the emergency release device 30 has an indicator device. The indicator device includes an indicator rod 48, which has a display section 50 and a control section 52. The control section 52 is stepped from the display section 50 and has a smaller diameter. The indicator rod 48 is preferably composed of at least one plastic material and extends centrally through the threaded spindle 34 and is guided therein in a sealed manner such that movement is possible in the axial direction. Here, the indicator rod 48 is prestressed by a spring 54 with respect to a stepped section 56 in the threaded spindle 34 in such a way that the display section 50 is pressed outward.

Figure 2:
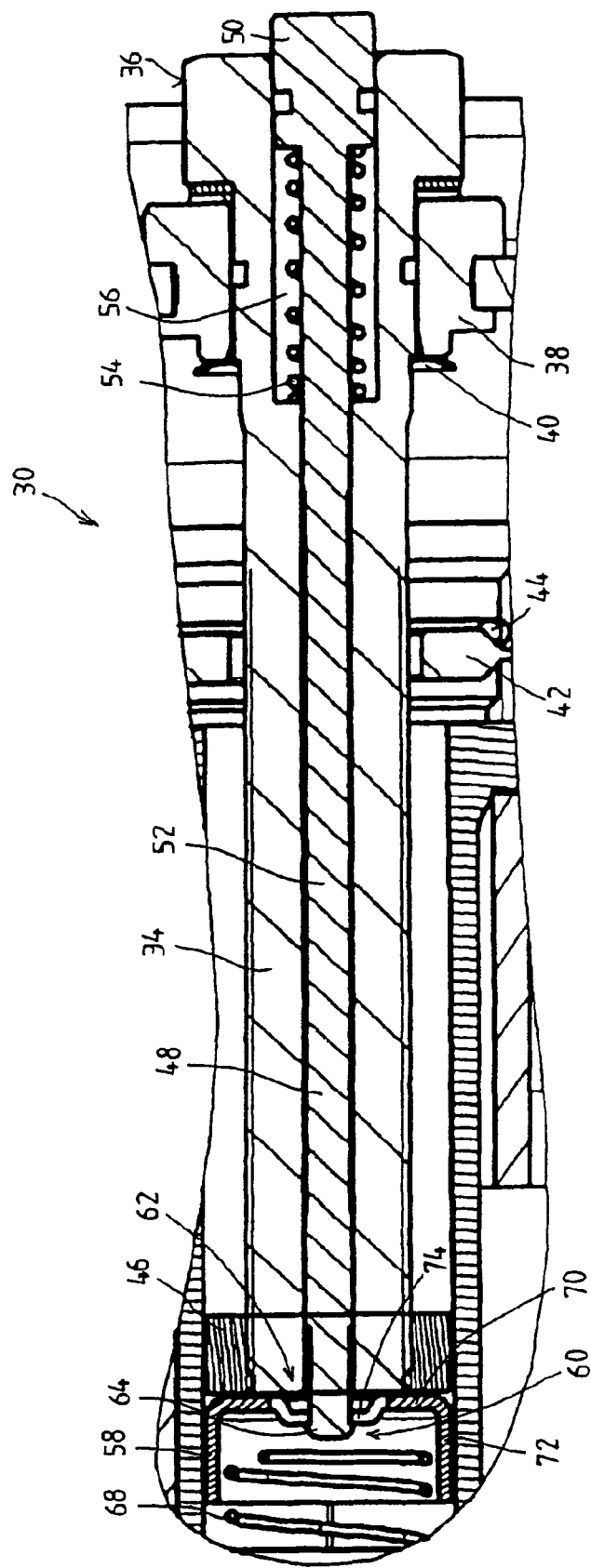
FIG. 2 shows an enlarged detail of the emergency release device of FIG. 1.

As can be seen clearly in FIG. 2, a stop body 58 is provided at that end of the control section 52 which is remote from the display section 50. The stop body 58 is arranged transversely with respect to the axial direction, serves as a stop and protrudes radially beyond the threaded spindle 34 in such a way that the outer edge of the stop body 58 can come into contact with the nut 46. The stop body 58 is connected positively to the indicator rod 48 by a releasable latching or clipping connection 60, which is produced by way of an axial relative movement between the indicator rod 48 and the stop body 58.

At least in the region of one edge of a receiving opening 62 for the end of the indicator rod 48, the stop body 58 is particularly preferably of an elastic configuration such that the edge of the receiving opening 62 can be passed and reached behind by an annular collar 64 which is formed on the end of the indicator rod 48 and has a greater diameter than the diameter of the receiving opening 62, on account of the relative movement between the indicator rod 48 and the stop body 58. In particular, the stop body 58 is supported on the spring-loaded brake piston rod 22 in a sprung manner by way of a spring 68 via a ventilating device 66 (not explained in greater detail here) if the indicator rod 48 is moved axially with respect to the stop body 58 in order to produce the latching connection 60.

The stop body 58 is, for example, of a cup-shaped configuration, having a bottom 70 which has the receiving opening 62 and having a casing wall 72 which is guided linearly in the spring-loaded brake piston rod 22. The opening of the cup-shaped stop body 58 points away from the indicator rod 48 and the spring 68 is enclosed at least partially by its casing wall 72. The cup-shaped stop body 58 is preferably manufactured from at least one plastic.

In particular, the central region of the cup-shaped stop body 58, which central region has the receiving opening 62, is configured as a separate component 74 in the form of a disk which has, for example, a greater elasticity than the remaining stop body 58. The stop body 58 is then guided by the more rigid casing wall 72, while the latching connection 60 with the indicator rod 48 is facilitated by the central disk 74 which is more elastic in comparison and is held radially in an opening in the bottom 70 of the remaining more rigid stop body 58.

During the assembly of the emergency release device 30, first of all the nut 46 is arranged coaxially onto the cup-shaped stop body 58 in the applied state of the spring-loaded brake, that is to say with the spring-loaded brake piston 16 removed from the bottom 18 of the housing 6. The spring-loaded brake chamber 10 of the spring-loaded brake cylinder 4 is then ventilated, as a result of which the spring-loaded brake piston 16 moves into its end release position and the spring-loaded piston rod 22 moves together with the cup-shaped stop body 58 and the nut 46 in the direction of the end of the threaded spindle 34, until the nut 46 acts on the first thread of the threaded spindle 34. The threaded spindle 34 is then rotated from outside the housing 6, until the nut 46 bears against the bearing section 42 of the piston collar 20. During this operation, the stop body 58 is prestressed by the spring 68 against the end of the threaded spindle 34.

The indicator rod 48 is then pushed linearly to the inside, until its end which is provided with the annular collar 64 passes the edge of the receiving opening 62 of the stop body 58 while widening it elastically in the radial direction and then, reaching behind said edge, produces the releasable latching or clipping connection 60 between the indicator rod 48 and the stop body 58. Here, the stop body 58 is supported on the spring-loaded brake piston rod 22 by the spring 68 counter to the compressive force which is exerted by the indicator rod 48. The rebound of the stop body 58 by way of the spring 68 after penetrating the receiving opening, which has a somewhat smaller diameter than the diameter of the annular collar 64, assists the production of the latching connection 60.

For the emergency release of the spring-loaded brake cylinder by the emergency release device 30, that is to say for canceling the brake action of the spring-loaded brake, the hexagonal head 36 of the threaded spindle 34 is rotated such that a side face of the nut 46 bears against the bearing section 42 of the piston collar 20 and pulls the latter in the direction of the bottom 18 of the housing 6 during the rotational movement, counter to the prestress of the accumulator spring 12. Here, according to the illustration in FIG. 1, the display section 50 of the indicator rod 48 is loaded by the spring 54 such that an outer end of it protrudes beyond the hexagonal head 36 to the outside and as a result indicates that the spring-loaded brake cylinder 4 is emergency released.

If the spring-loaded brake is then to be applied manually again, the threaded spindle 34 is rotated by way of the hexagonal head 36 in such a way that the nut 46 moves away from the bottom 18 of the housing 6 in the axial direction. By continued screwing of the nut 46 into the spring-loaded brake piston rod 22, it finally comes into engagement with the stop body 58 of the indicator device and as a result forces a linear displacement of the indicator rod 48 counter to the spring force of the spring 54. As a result, the display section 50 is moved relative to the hexagonal head 36 and the outer end of the threaded spindle 34 in such a way that it is pulled in until it is arranged substantially flush with respect thereto. A user can see in this way that the spring-loaded brake cylinder 1 is not manually emergency released.

On account of the prestress by the accumulator spring 12, the piston collar 20 follows this movement, the side face of the nut 46 remaining in contact with the bearing section 42 on the piston collar 20. The spring-loaded brake piston rod 22 also moves with the piston collar 20 away from the bottom 18 of the housing 6, with the result that a braking force is exerted on the service brake device (not shown here) on the other side of the flange 8. As soon as the maximum braking force is present, the piston collar 20 does not follow the nut 46 further, however.

The spring-loaded brake cylinder 1 is then in the normal operating position, in which either the brake actuation is initiated by being loaded with compressed air or, if there is no compressed air, a braking action is initiated by the accumulator spring 12. For normal pneumatic operation of the spring-loaded brake cylinder 2, compressed air is introduced into the spring-loaded brake chamber 10 through an air inlet (not shown here) in a controlled manner such that the compressed air overcomes the spring force of the accumulator spring 12 and thus optionally releases or actuates the brake as a function of the level of the pressure.

TABLE OF REFERENCE NUMERALS

1 Combined cylinder
2 Spring-loaded brake device
4 Spring-loaded brake cylinder
6 Housing
8 Flange
10 Spring-loaded brake chamber
12 Accumulator spring
14 Spring chamber
16 Spring-loaded brake piston
18 Bottom
20 Piston collar
22 Spring-loaded brake piston rod
24 Through opening
26 Dividing wall
28 Guide section
30 Emergency release device
32 Cavity
34 Threaded spindle
36 Hexagonal head
38 Sleeve
40 Locking washer
42 Bearing section
44 Securing ring
46 Nut
47 Guide part
48 Indicator rod
50 Display section
52 Control section
54 Spring
56 Stepped section
58 Stop body
60 Latching connection
62 Receiving opening
64 Annular collar
66 Ventilating device
68 Spring means
70 Bottom
72 Casing wall
74 Disk The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A spring-loaded brake cylinder for a commercial vehicle, comprising:
 a spring-loaded brake piston actuatable by an accumulator spring;
 a housing in which the brake piston is mounted, the brake piston delimiting on one side a spring-loaded brake chamber and on an opposite side a spring chamber which receives the accumulator spring, wherein the spring-loaded brake piston is connected to a spring-loaded piston rod;
 an emergency release device operatively configured to release the spring-loaded brake cylinder by axially displacing the spring-loaded brake piston counter to a prestress of the accumulator spring;
 wherein the mechanical emergency release device comprises
  (a) a threaded spindle fixed rotatably in the housing and being in engagement with an axially displaceable transmission device secured non-rotatably in the emergency release device, the transmission device being brought into contact with a bearing face on the spring-loaded brake piston for a release of the spring-loaded brake cylinder;
  (b) an indicator rod which indicates a position of the spring-loaded brake piston, the indicator rod extending through the threaded spindle and being displaceable in an axial direction with respect to the threaded spindle; and
  (c) a stop body operatively configured for engagement with the transmission device, the stop body being arranged in an end region of the indicator rod and being connected positively to the indicator rod via a latching connection produced by an axial relative movement between the indicator rod and the stop body.

2. The spring-loaded brake cylinder according to claim 1, wherein the stop body has an elastic configuration at least in a region of one edge of a receiving opening that receives the end of the indicator rod, the elastic configuration of the stop body allowing an annular collar formed on the end of the indicator rod to pass through the edge of the receiving opening and reach behind the edge; and wherein the annular collar has a diameter greater than a diameter of the receiving opening.

3. The spring-loaded brake cylinder according to claim 2, wherein the axial relative movement between the indicator rod and the stop body occurs via an axial movement of the indicator rod relative to the stop body, the stop body being supported on the spring-loaded brake piston rod.

4. The spring-loaded brake cylinder according to claim 3, wherein the stop body is supported on the spring-loaded brake piston rod in a sprung manner via a spring if the indicator rod is moved axially with respect to the stop body to produce the latching connection.

5. The spring-loaded brake cylinder according to claim 4, wherein the stop body has a cup-shaped configuration, a bottom side of which includes the receiving opening and a casing wall of which is configured to be guided linearly in the spring-loaded brake piston rod.

6. The spring-loaded brake cylinder according to claim 5, wherein the cup-shaped stop body is open away from the indicator rod and the spring is enclosed at least partially by the casing wall of the cup-shaped stop body.

7. The spring-loaded brake cylinder according to claim 1, wherein the stop body comprises at least one plastic.

8. The spring-loaded brake cylinder according to claim 2, wherein the stop body comprises at least one plastic.

9. The spring-loaded brake cylinder according to claim 8, wherein a central region of the stop body comprises the receiving opening and is configured as a separate component having a greater elasticity than a remaining portion of the stop body.

10. The spring-loaded brake cylinder according to claim 1, wherein the indicator rod is manufactured in one-piece from at least one plastic.

11. The spring-loaded brake cylinder according to claim 1, wherein the threaded spindle includes a tool projection at one end thereof formed in one piece with the threaded spindle, said tool projection being operatively configured to allow for a tool to be applied thereto.

12. The spring-loaded brake cylinder according to claim 1, wherein the transmission device is a nut.

13. A combined service brake and spring-loaded brake cylinder, comprising:

a service brake cylinder in which is arranged a service brake piston, the service brake piston being actuatable by a pressure medium and delimiting a service brake chamber, wherein the service brake piston is connected to a service brake piston rod configured to act on a brake;

a spring-loaded brake cylinder comprising:
a spring-loaded brake piston actuatable by an accumulator spring;
a housing in which the brake piston is mounted, the brake piston delimiting on one side a spring-loaded brake chamber and on an opposite side a spring chamber which receives the accumulator spring, wherein the spring-loaded brake piston is connected to a spring-loaded piston rod;
an emergency release device operatively configured to release the spring-loaded brake cylinder by axially displacing the spring-loaded brake piston counter to a prestress of the accumulator spring;
wherein the mechanical emergency release device comprises (a) a threaded spindle fixed rotatably in the housing and being in engagement with an axially displaceable transmission device secured non-rotatably in the emergency release device, the transmission device being brought into contact with a bearing face on the spring-loaded brake piston for a release of the spring-loaded brake cylinder; (b) an indicator rod which indicates a position of the spring-loaded brake piston, the indicator rod extending through the threaded spindle and being displaceable in an axial direction with respect to the threaded spindle; and (c) a stop body operatively configured for engagement with the transmission device, arranged in an end region of the indicator rod, said stop body being connected positively to the indicator rod via a latching connection produced by an axial relative movement between the indicator rod and the stop body;

wherein the spring-loaded brake piston rod extends through an opening of a dividing wall between the service brake cylinder and the spring-loaded brake cylinder, said dividing wall separating the service brake cylinder and the spring-loaded brake cylinder from one another.

14. A method of assembling a spring-loaded brake cylinder for a commercial vehicle having an emergency release device that includes an indicator device for indicating a position of a spring-loaded brake piston of the spring-loaded brake cylinder, the method comprising the acts of:

arranging a stop body in a region of one end of an indicator rod of the indicator device, the stop body being capable of engaging a transmission device that bears against the spring-loaded brake piston for an emergency release of the spring-loaded brake cylinder;

moving the indicator rod axially relative to the stop body to produce a latching positive connection between the stop body and the indicator rod.

15. The method according to claim 14, further comprising the act of spring-loading the stop body on the spring-loaded brake piston rod during the moving act in order to produce the positive latching connection.

\* \* \* \* \*